United States Patent
Branson et al.

(10) Patent No.: US 8,943,120 B2
(45) Date of Patent: Jan. 27, 2015

(54) ENHANCED BARRIER OPERATOR WITHIN A STREAMING ENVIRONMENT

(75) Inventors: Michael J. Branson, Rochester, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/334,200

(22) Filed: Dec. 22, 2011

(65) Prior Publication Data

US 2013/0166617 A1    Jun. 27, 2013

(51) Int. Cl.
*G06F 15/16* (2006.01)
*H04L 29/08* (2006.01)
*H04L 29/06* (2006.01)

(52) U.S. Cl.
CPC .... *H04L 29/08072* (2013.01); *H04L 29/06095* (2013.01)
USPC .......................................... 709/201; 709/231

(58) Field of Classification Search
CPC ... G06F 15/16; H04L 67/10; H04L 29/08072; H04L 29/06; H04L 29/08135
USPC ........................................................ 709/201
See application file for complete search history.

(56) References Cited

U.S. PATENT DOCUMENTS

| | | | |
|---|---|---|---|
| 5,517,668 A * | 5/1996 | Szwerinski et al. | 709/230 |
| 6,128,640 A | 10/2000 | Kleinman | |
| 7,080,376 B2 | 7/2006 | Buch | |
| 7,093,249 B2 | 8/2006 | Melamed et al. | |
| 7,210,105 B2 | 4/2007 | Melamed et al. | |
| 7,644,172 B2 * | 1/2010 | Stewart et al. | 709/231 |
| 8,073,922 B2 * | 12/2011 | Bates | 709/208 |
| 8,103,714 B2 * | 1/2012 | Dorai et al. | 709/201 |
| 8,234,391 B2 * | 7/2012 | Bonaguro et al. | 709/230 |
| 8,260,768 B2 * | 9/2012 | Wang et al. | 707/718 |
| 2002/0075857 A1 * | 6/2002 | LeBlanc | 370/352 |
| 2002/0124241 A1 | 9/2002 | Grey et al. | |
| 2008/0263325 A1 | 10/2008 | Kudva et al. | |
| 2009/0100029 A1 * | 4/2009 | Jain et al. | 707/4 |
| 2009/0178043 A1 * | 7/2009 | Prasanna et al. | 718/102 |
| 2009/0254774 A1 * | 10/2009 | Chamdani et al. | 714/2 |
| 2009/0259671 A1 * | 10/2009 | Garudadri et al. | 707/100 |
| 2009/0259906 A1 * | 10/2009 | Garudadri et al. | 714/747 |

(Continued)

*Primary Examiner* — Kristie Shingles
*Assistant Examiner* — Timothy Sowa
(74) *Attorney, Agent, or Firm* — Patterson & Sheridan LLP

(57) ABSTRACT

Techniques are described for processing data. Embodiments receive streaming data to be processed by a plurality of processing elements. An operator graph of the plurality of processing elements is established. The operator graph defines at least one execution path and at least one of the processing elements of the operator graph is configured to receive data from at least one upstream processing element and transmit data to at least one downstream processing element. Additionally, a first processing element in the operator graph includes a barrier operator that joins the output of one or more upstream operators included on one or more of the plurality of processing elements. Embodiments initiate one or more timeout conditions at the barrier operator. Embodiments also determine, at the first processing element, that one or more timeout conditions have been satisfied before data has been received from each of the one or more upstream operators. Upon determining that the one or more timeout conditions have been satisfied, embodiments generate output data at the barrier operator without the data from at least one of the one or more upstream operators.

13 Claims, 7 Drawing Sheets

(56) References Cited

U.S. PATENT DOCUMENTS

| | | |
|---|---|---|
| 2009/0271529 A1* | 10/2009 | Kashiyama et al. .............. 710/1 |
| 2010/0106946 A1* | 4/2010 | Imaki et al. ................... 712/220 |
| 2010/0293532 A1* | 11/2010 | Andrade et al. .............. 717/140 |
| 2010/0293535 A1* | 11/2010 | Andrade et al. .............. 717/156 |
| 2010/0332753 A1 | 12/2010 | Gray et al. |
| 2012/0005248 A1* | 1/2012 | Garudadri et al. ............ 708/207 |
| 2012/0284420 A1* | 11/2012 | Shukla et al. ................. 709/231 |

\* cited by examiner

US 8,943,120 B2

ENHANCED BARRIER OPERATOR WITHIN A STREAMING ENVIRONMENT

BACKGROUND

Embodiments of the present invention generally relate to stream computing applications. Specifically, the invention relates to managing barrier operators in a streaming data environment with processing elements receiving and outputting data.

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments provide a method, system and computer program product for processing data. The method, system and computer program product include receiving streaming data to be processed by a plurality of processing elements. Additionally, the method, system and computer program product include establishing an operator graph of the plurality of processing elements, the operator graph defining at least one execution path and where at least one of the processing elements of the operator graph is configured to receive data from at least one upstream processing element and transmit data to at least one downstream processing element, and where a first processing element in the operator graph includes a barrier operator that joins the output of one or more upstream operators included in one or more of the plurality of processing elements. The method, system and computer program product also include initiating one or more timeout conditions at the barrier operator. Furthermore, the method, system and computer program product include determining, at the first processing element, that one or more timeout conditions have been satisfied before data has been received from each of the one or more upstream operators. The method, system and computer program product additionally include, upon determining that the one or more timeout conditions have been satisfied, generating output data at the barrier operator without the data from at least one of the one or more upstream operators.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
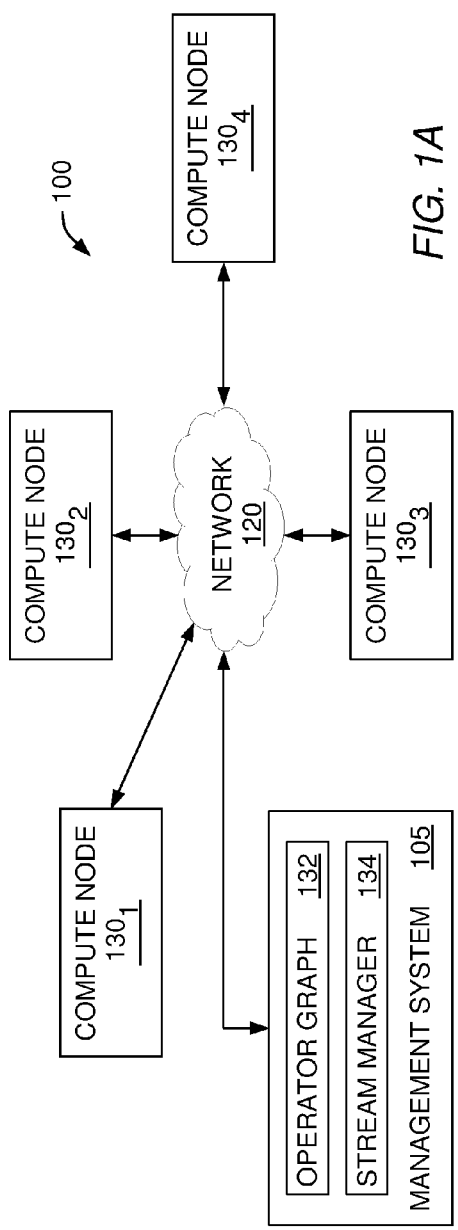
FIGS. 1A-1B illustrate a computing infrastructure configured to execute a stream computing application, according to one embodiment described herein.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each of one which contains one or more processing modules (i.e., operators). These processing elements can also be replicated on multiple nodes with load balancing among them. Operators in a stream computing application can be fused together to form a processing element. Additionally, multiple processing elements can be grouped together to form a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

However, because stream computing applications often deal with large volumes of data, the processing of which is spread over multiple processing elements across multiple compute nodes, an operator may need to produce an output faster than it is able. Instead of requiring an operator to generate output data by processing currently received input data, an operator may instead output predetermined data. This predetermined data may be based on, for example, an average of the output data that was previously processed and transmitted by the operator. Moreover, the operator may only transmit predicted output data if the previously processed output data falls within an acceptable range. That is, if the previous output data is deterministic. An operator, or data flowing out of the operator, is "deterministic" if the values of the output data can be predicted with some minimum amount of confidence. For example, output data may be predictable or deterministic because a certain input always yields a certain output or because the output data typically has a value within a certain range—e.g., the output values for an operator are within a predefined range 80% of the time. Once the output data is deemed deterministic, using the predicted output data may allow the operator to transmit output data faster, or with less processing, than it otherwise would be able.

Moreover, the operator may output predetermined data only if there is a need to limit or stop processing received input data. For example, the stream computing application may be experiencing backpressure. "Backpressure" is a term used to describe one or more operators that are unable to transmit or receive additional data because either their buffer or a buffer associated with a downstream operator is full. In the case of some real-time applications, the operator may trade accuracy for increased data throughput where the time required for data to propagate through the stream computing application is an important factor.

Embodiments of the invention provide techniques for providing an enhanced barrier operator that is configured to intelligently join the outputs of one or more other operators. Embodiments receive streaming data to be processed by a plurality of processing elements, the processing elements processing at least a portion of the received data by operation of one or more computer processors. Additionally, an operator graph of the plurality of processing elements is established. Generally, the operator graph defines at least one execution path and where at least one of the processing elements of the operator graph is configured to receive data from at least one upstream processing element and transmit data to at least one downstream processing element. Further, a first processing element in the operator graph is configured with a barrier operator that joins the output of one or more upstream operators. Embodiments initiate one or more timeout conditions at the barrier operator. If embodiments determine that the one or more timeout conditions are satisfied before data has been received from each of the one or more upstream operators, output data is generated at the barrier operator without receiving the entirety of the data from at least one of the one or more upstream operators.

Figure 1B:
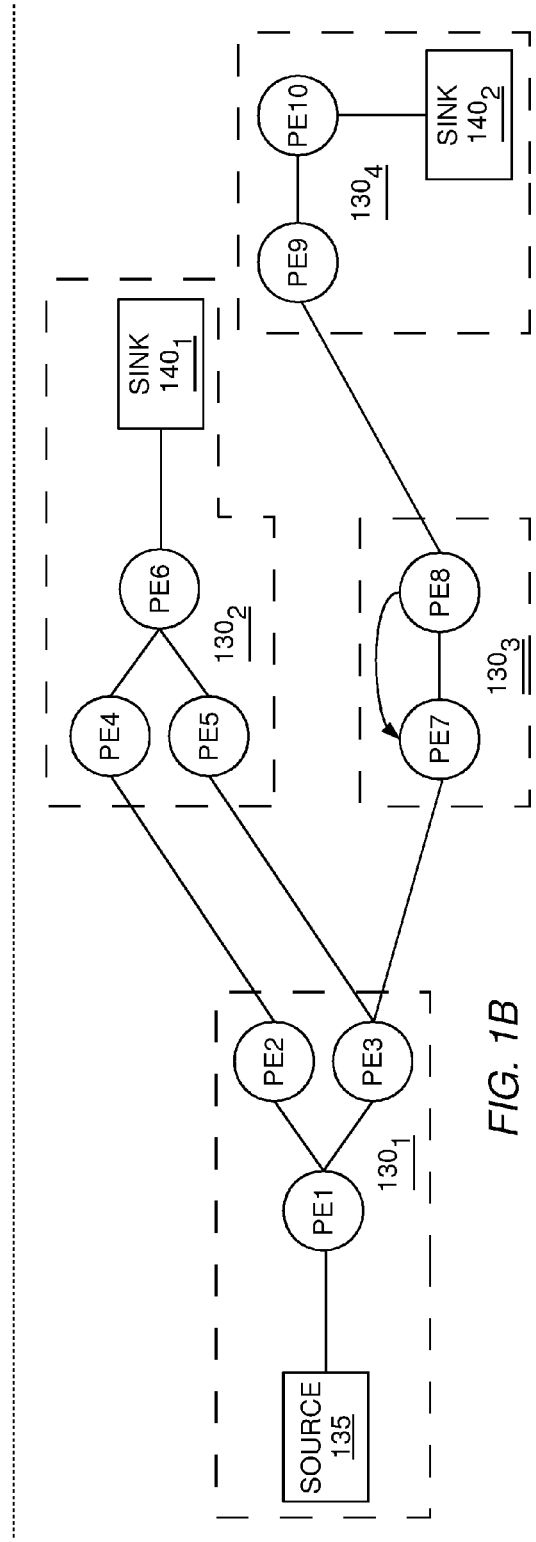

FIGS. 1A-1B illustrate a computing infrastructure configured to execute a stream computing application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements (or what data-tuples flow to the processing elements) running on the compute nodes $130_{1-4}$. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. Of note, because a processing element is a collection of fused operators, it is equally correct to describe the operator graph as execution paths between specific operators, which may include execution paths to different operators within the same processing element. FIG. 1B illustrates execution paths between processing elements for the sake of clarity. While a processing element may be executed as an independently running process with its own process ID (PID) and memory space, multiple processing elements may also be fused to run as single process or job (with a PID and memory space). In cases where two (or more) processing elements are running independently, inter-process communication may occur using a "transport" (e.g., a network socket, a TCP/IP socket, or shared memory). However, when processes are fused together, the fused processing elements can use more rapid communication techniques for passing tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. Of note, although the operators within the processing elements are not shown in FIG. 1B, in one embodiment the data tuples flow between operators within the processing elements rather than between the processing elements themselves. For example, one or more operators within PE1 may split data attributes received in a tuple and pass some data attributes to one or more other operators within PE2, while passing other data attributes to one or more additional operators within PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5

(i.e., from operator(s) within PE3 to operator(s) within PE5) also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
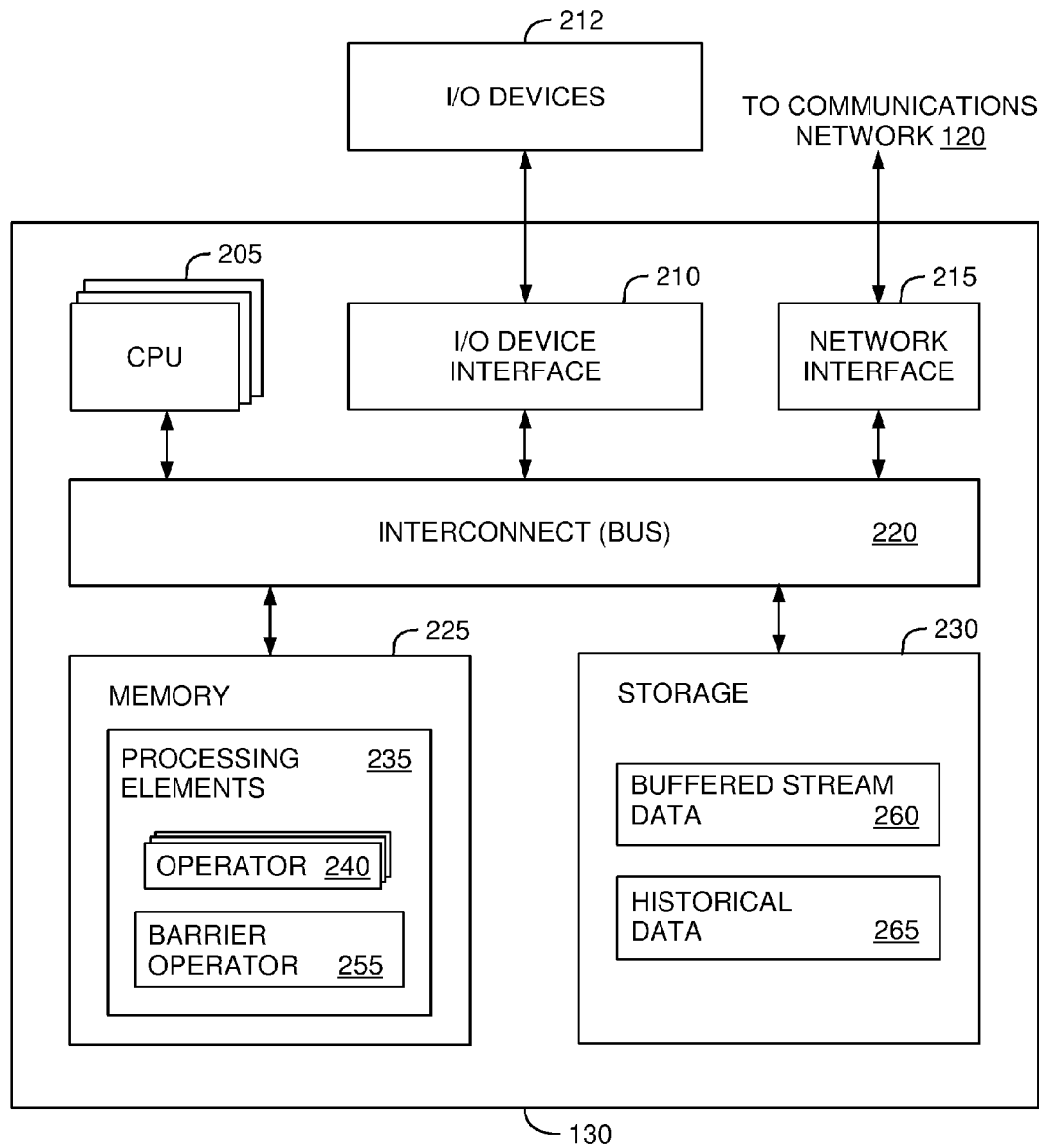
FIG. 2 is a more detailed view of the compute node of FIGS. 1A-1B, according to one embodiment described herein.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state disk (SSD), or flash memory storage drive, may store non-volatile data.

In this example, the memory 225 includes a plurality of processing elements 235. The processing elements 235 include a collection of operators 240 and a barrier operator 255. As noted above, each operator 240 may provide a small chunk of executable code configured to process data flowing into a processing element (e.g., PE 235) and to emit data to other operators 240 in that PE and to other processing elements in the stream computing application. Such processing elements may be on the same compute node 130 or on other compute nodes accessible over the data communications network 120. Generally, the barrier operator 255 is a specific type of operator that is configured to intelligently join the outputs of one or more other operators 240. Memory 225 may also contain stream connection data (not shown) which represents the connections between PEs on compute node 130 (e.g., a TCP/IP socket connection between two separate PEs 235), as well as connections to other compute nodes 130 with upstream and or downstream PEs in the stream computing application, also via TCP/IP sockets (or other inter-process data communication mechanisms).

As shown, storage 230 contains buffered stream data 260 and historical data 265. The buffered stream data 260 represents a storage space for data flowing into the compute node 105 from upstream operators (or from a data source for the stream computing application). For example, buffered stream data 260 may include data tuples waiting to be processed by an operator in one of the PEs 235—i.e., a buffer. Buffered stream data 260 may also store the results of data processing performed by upstream operators that will be sent to downstream operators. For example, a first operator may have to store tuples intended for a downstream operator if the first operator already has a full buffer, which may occur when the operator graph is experiencing backpressure. Storage also contains historical data 265, which represents previous output values from the various operators in the stream computing application. Such historical data 265 could be used, for instance, to determine a substitute output for a particular operator which could be used as output for the operator instead of the normal output from the operator processing current input values. Such substitute output can be, for example, the average of a plurality of previously computed output values or the output value that corresponds to a particular input value received by the operator.

Figure 3:
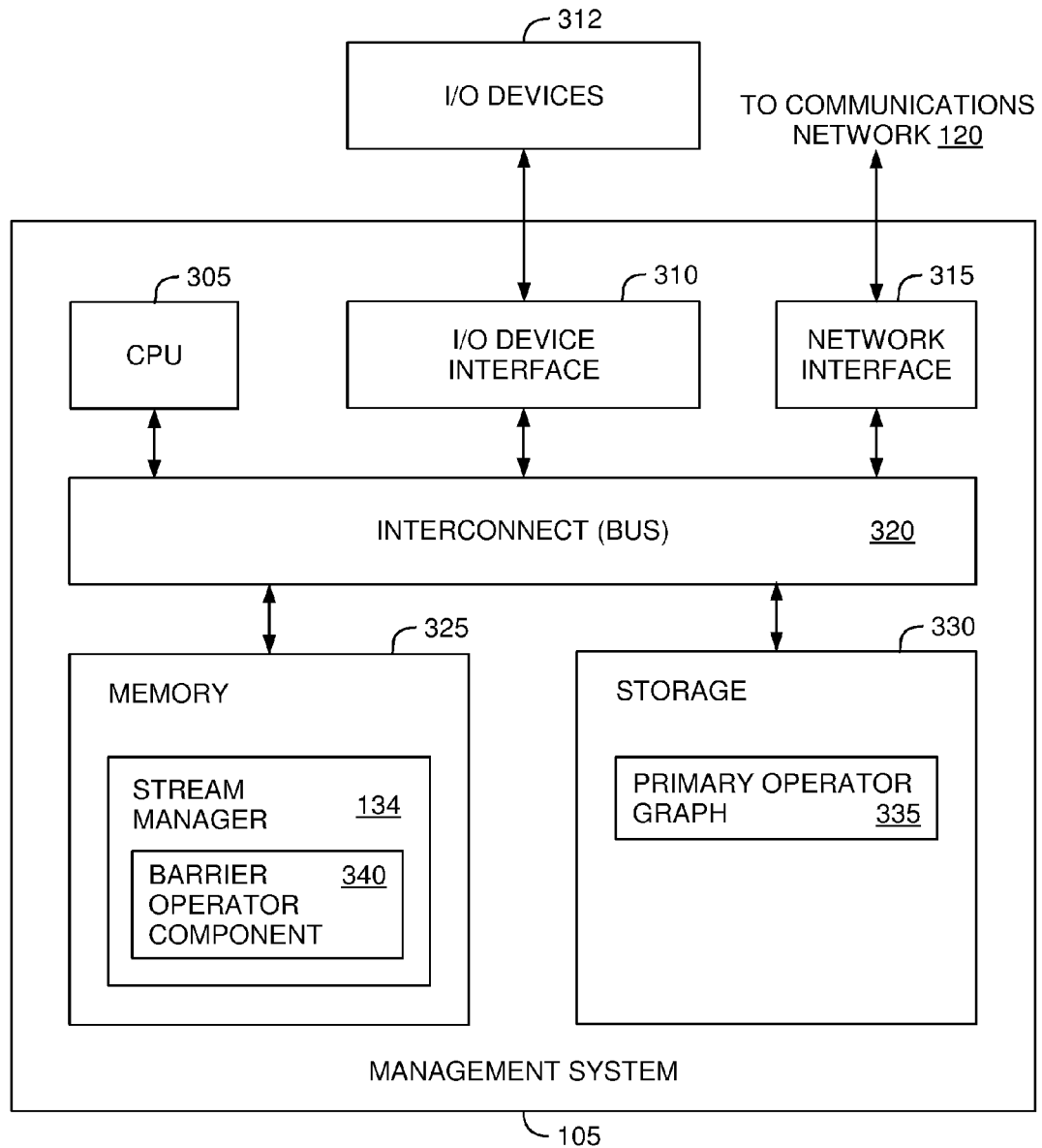
FIG. 3 is a more detailed view of the server computing system of FIG. 1, according to one embodiment described herein.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 335. The stream manager 134 may use the primary operator graph 335 to route tuples to PEs 235 for processing. The stream manager 134 also includes a barrier operator component 340. As discussed above, a barrier operator (e.g., barrier operator 255) is an operator configured to join the outputs of one or more upstream operators. The barrier operator may further be configured to wait on a requisite amount of data from each of the upstream operators before joining the outputs. For example, a particular barrier operator could be configured to join 10 tuples of data from a first upstream operator together with 5 tuples from a second upstream operator. The barrier operator component 340 may be configured to initiate one or more timeout conditions until the next set of outputs from upstream operators are processed. For example, the barrier operator component 340 could initiate a timer configured to expire after a predetermined period of time as one of the timeout conditions. As another example of a timeout condition, the barrier operator component 340 could monitor a backlog of data and upon determining the backlog exceeds a threshold amount of data (e.g., measured in tuples), the barrier operator component 340 could determine that the timeout condition is satisfied.

If a requisite amount of data is received from each of the upstream operators before any of the timeout conditions are satisfied, the barrier operator joins the received data into one or more output tuples and transmits the output tuples to one or more downstream operators. On the other hand, if the barrier operator component 340 determines that one or more of the timeout conditions are satisfied before the entirety of the data from the upstream operators is received at the barrier operator, the barrier operator component 340 may generate an output at the barrier operator without having received all of the data from the upstream operators. That is, if the barrier operator has received data from all the relevant upstream operators except one, the barrier operator component 340 could join the received data with substitute output data for the one operator. The barrier operator component 340 could transmit the joined data to one or more downstream operators, and could then re-initiate the one or more timeout conditions and begin waiting on the next window of data from the upstream operators.

For example, the barrier operator component 340 could be configured with logic for generating predicted output data for the upstream operators. The barrier operator component 340 may use previously transmitted output data from each of the upstream operators as well as current or previously received input data from the operators to determine predicted output data. For example, the barrier operator component 340 may compute the average for a plurality of previously transmitted output values or determine the mode—i.e., most frequently used—of the output values. The barrier operator is then able to join the predicted output data with any data already received from the upstream operators. Advantageously, doing so provides an enhanced barrier operator that can avoid delays within the stream computing application through intelligent use of substitute output values (e.g., predictive output values).

In one embodiment, the barrier operator component 340 is configured to use a predetermined substitute output value for a given operator. For instance, the barrier operator component 340 could be configured to use a default value as a substitute output for a particular operator. As another example, the barrier operator component 340 could be configured to use an error code message as a substitute output, the error code message describing the conditions under which the substitute output is generated (e.g., which timeout condition(s) are satisfied, an amount of data received from the upstream operators, and so on). Additionally, although the above example describes an embodiment in which substitute output is used when any of the initiated timeout conditions are satisfied before the output data from the upstream operators is received, one of ordinary skill in the art will recognize that numerous other configurations are possible. For example, the barrier operator component 340 could be configured to use substitute outputs only in the situation where all of the timeout conditions are satisfied before the requisite amount of data from the upstream operators is received, or the barrier operator component 340 could be configured to use substitute output values when a particular number of timeout conditions are satisfied (e.g., two or more timeout conditions are satisfied) before the upstream data is received.

Additionally, operators in the operator graph may have a requisite amount of data to be received from upstream operators before the operators can begin normal processing operations. In one embodiment, the requisite amount of data is represented as a window of data. For instance, the window of data could be, without limitation, a tumbling window of data or a sliding window of data. A tumbling window includes a one or more tuples (i.e., a chunk of divisible data) that after being processed by an operator 240 are discarded. In contrast, a sliding window may include tuples that were processed in a previously triggered sliding window.

For example, assume that a first operator is configured to use a tumbling window and a second operator is configured to use a sliding window. Further assume that both the first and second operators have received four initial tuples T1, T2, T3 and T4, such that each operator has a buffer of {T1, T2, T3, T4}, and that the windowing parameters associated with the operator instructs the window activator to trigger a window once the buffer reaches a size of four tuples. Note that, in other embodiments, the operator can also be configured to trigger a window after a particular time period has elapsed.

After the window is triggered and the operator 240 evaluates the tuples within the window, the tuples within a tumbling window are discarded. Accordingly, when the next tuple of T5 is received by the first operator, the operator discards the previously received tuples T1, T2, T3 and T4 and stores the new tuple T5 in the buffer. Thus, the buffer of the first operator at this time is {T5}. The first operator in this example would then store subsequently received tuples in the buffer until a new window is triggered (e.g., after the buffer reaches a size of four tuples, after a particular period of time has elapsed, etc.)

In contrast, the second operator using a sliding window technique maintains a portion of the tuples in its buffer when subsequent tuples are received after a window is triggered. Like with tumbling windows, a sliding window may trigger initially based on whether the requisite number of tuples are received or if the predefined period of time has expired. However, unlike a tumbling window, a sliding window may trigger a window each time a subsequent tuple is received after the initial window is triggered. For example, if a stream application wants a four minute moving average of a stock ticker that is sampled every minute, the window activator for an operator could wait four minutes until four minutes worth of data arrives at the buffer and then could trigger a new window each time a new tuple is received or another minute passes. For purposes of the present example, assume that the second operator is configured to trigger a window after four tuples of data are received and thus triggers after the buffer contains the tuples {T1, T2, T3, T4}. When the second operator then receives the subsequent tuple T5, the second operator may expel one or more of the tuples from the previous window (e.g., the oldest tuple T1), but may include one or more of the tuples in the previous window in the new window. Thus, after receiving the tuple T5, the second operator could expel the tuple T1 from the buffer and could trigger a second window with the buffer {T2, T3, T4, T5}. Upon receiving the subsequent tuple T6, the second operator could expel the tuple T2, having a buffer of {T3, T4, T5, T6}, and so on.

Additionally, the window activator may wait for multiple time periods to pass, or multiple tuples to be received, before triggering a new sliding window. For example, the window activator may wait four time periods before triggering the first window but triggers a new sliding window every two time periods thereafter. Of course, all of the above examples are provided without limitation and are for illustrative purposes only. More generally, any form of a requisite amount of data or a window of data may be used in accordance with the embodiments described herein.

Figure 4A:
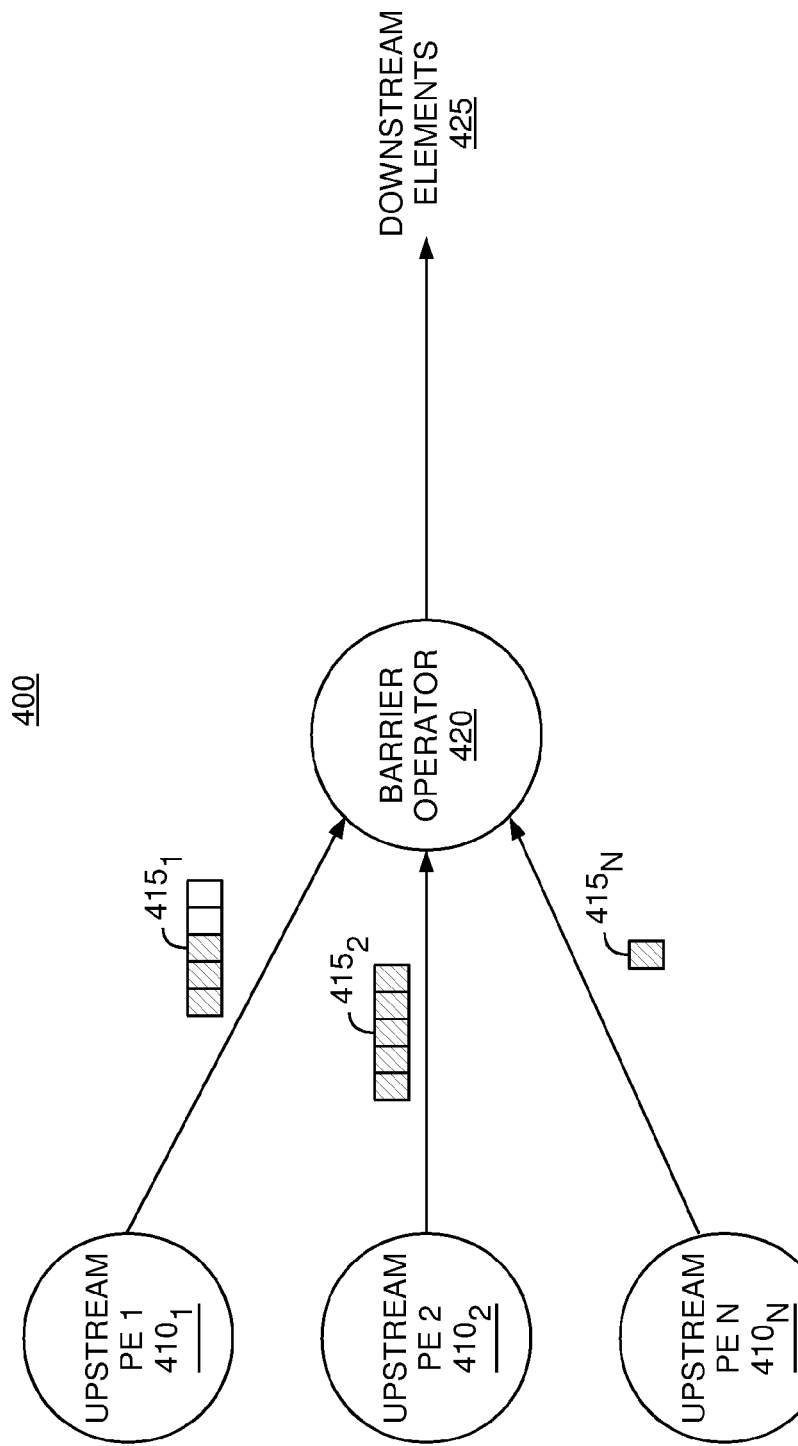
FIGS. 4A-B illustrate a computing infrastructure configured to execute a stream computing application including a barrier operator, according to one embodiment described herein.
Figure 4B:
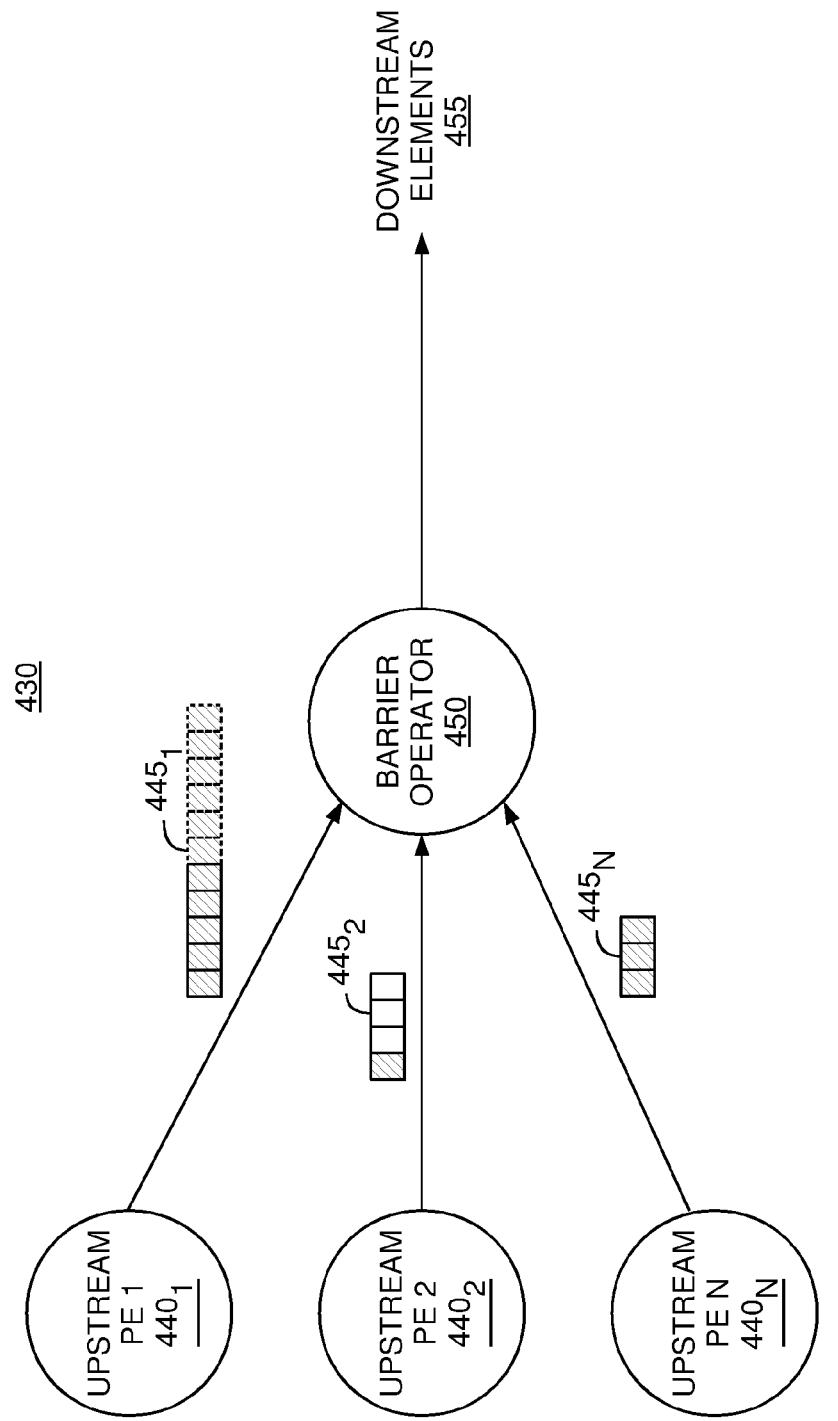

FIGS. 4A-B illustrate a computing infrastructure configured to execute a stream computing application including a barrier operator, according to one embodiment described herein. FIG. 4A illustrates a system 400 containing a plurality of upstream processing elements $410_{1-N}$ each including at least one operator configured to send output data to a barrier operator 420. The barrier operator 420, in turn, is configured to join the received data from the upstream operators and to transmit the joined data to one or more downstream operators in the downstream processing elements 425. Additionally, the depicted example shows a current data buffer $415_{1-N}$ from each of the respective operators in the upstream processing elements $410_{1-N}$. That is, as discussed above, the barrier operator 420 may be configured to wait for a requisite amount of data from the upstream operators before joining the received data. Thus, as shown, the buffer $415_1$ indicates that the barrier operator 420 has received 3 of 5 tuples from operators on upstream processing element 1 $410_1$, the buffer $415_2$ indicates that 5 of 5 tuples have been received from operators on the upstream processing element 2 $410_2$ and the buffer $415_N$ indicates that 1 of 1 tuples have been received from operators on the upstream processing element N $410_N$.

The barrier operator 420 may also be configured to initiate one or more timeout conditions in addition to waiting on the data from the operators on the upstream processing elements $410_{1-N}$. For instance, one such timeout condition could be a timer configured to expire after a predetermined period of time. As another example, a timeout condition could be a threshold amount of backlog data from the upstream operators. For example, as shown by the buffer $415_2$, the requisite amount of data from the operators on the upstream PE 2 $410_2$ is 5 tuples of data. However, the barrier operator 420 could be configured to generate one or more substitute output values to satisfy the requisite amount of data for the operators on the upstream PE 1 $410_1$ (i.e., to generate two substitute tuples to fill the buffer $415_1$), upon determining that 20 tuples of data have been received from the operators on the upstream PE 2 $410_2$ and that this amount of data exceeds a threshold for backlog data. As yet another example of a timeout condition, the barrier operator 420 could receive a punctuation signal (e.g., initiated by a user), indicating that the barrier operator 420 should immediately join any data received (generating substitute output values as needed) and transmit the joined data to operators on the one or more downstream processing elements 425.

For purposes of the current example, assume that the barrier operator 420 has determined that one of the initiated timeout conditions has been satisfied. However, as shown by the buffer $415_1$, the requisite amount of data from the operators on the upstream PE 1 $410_1$ has not yet been received. Upon determining the timeout condition is satisfied, the barrier operator 420 may generate a substitute output for the operators on the PE 1 $410_1$ and may join the substitute output with the received data from the operators on the other upstream PEs $410_{2-N}$. For example, the barrier operator 420 could generate the substitute output by averaging data from the three received tuples from the operators on PE 1 $410_1$ to generate two substitute tuples, thus giving the barrier operator 420 the requisite 5 tuples of data from the operators on PE 1 $410_1$. As another example, the barrier operator 420 could be configured to retrieve historical data describing previous outputs of the operators on the upstream PE 1 $410_1$ and could use the historical data to generate the two substitute tuples. Advantageously, doing so allows the barrier operator 420 to avoid undue delay in the stream computing application through the use of substitute output values.

FIG. 4B illustrates another example of a stream computing infrastructure configured with a barrier operator. As shown, the system 430 includes a plurality of upstream processing elements $440_{1-N}$ each having one or more operators configured to send output values to a barrier operator 450. In turn, the barrier operator 450 is configured to join the received output values and to transmit the joined data to one or more operators on downstream processing elements 455. Additionally, a plurality of data buffers $445_{1-N}$ are shown, with each data buffer $445_{1-N}$ corresponding to operator(s) on a respective one of the upstream processing elements $440_{1-N}$. For purposes of the current example, assume that the barrier operator is configured with a timeout condition that is satisfied when more than 10 tuples are received from operators on the upstream PE 1 $440_1$. As shown, the data buffer $445_1$ indicates that although the requisite number of tuples for the operators on the upstream PE 1 $440_1$ is 5 tuples, 11 tuples have been received from the operators on the upstream PE 1 $440_1$. Additionally, the data buffer $445_N$ indicates that 3 of the 3 requisite tuples have been received from the operators on upstream PE $440_N$. However, the data buffer $445_2$ indicates that only 1 of the 4 requisite tuples have been received from the operators on the upstream PE 2 $440_2$.

As 11 tuples have been received from the operators on upstream PE 1 $440_1$, the barrier operator 450 could determine that the timeout condition of more than 10 tuples from PE 1 $440_1$ is satisfied. The barrier operator 450 could generate one or more output values using the received data and generating substitute output as needed, and could transmit the one or more output values to operators on the downstream processing elements 455. Accordingly, the barrier operator 450 could generate substitute output for operators on PE 2 $440_2$ to achieve the requisite number of tuples (i.e., 4 tuples) and could join the generated output with the already-received tuple from the operators on PE 2 $440_2$ (i.e., as shown in the data buffer $445_2$) along with the received data from the operators on PE 2 $440_1$ and PE N $440_N$ (i.e., as shown in the data buffers $445_1$ and $445_N$, respectively). The barrier operator 450 could then transmit the joined data to operators on downstream processing elements 455. Doing so advantageously allows the barrier operator 450 to trigger a join operation responsive to detecting a substantial amount of data amassing in the data buffer for one or more of the upstream operators, thereby avoiding a backlog of data accruing at the barrier operator 450.

Figure 5:
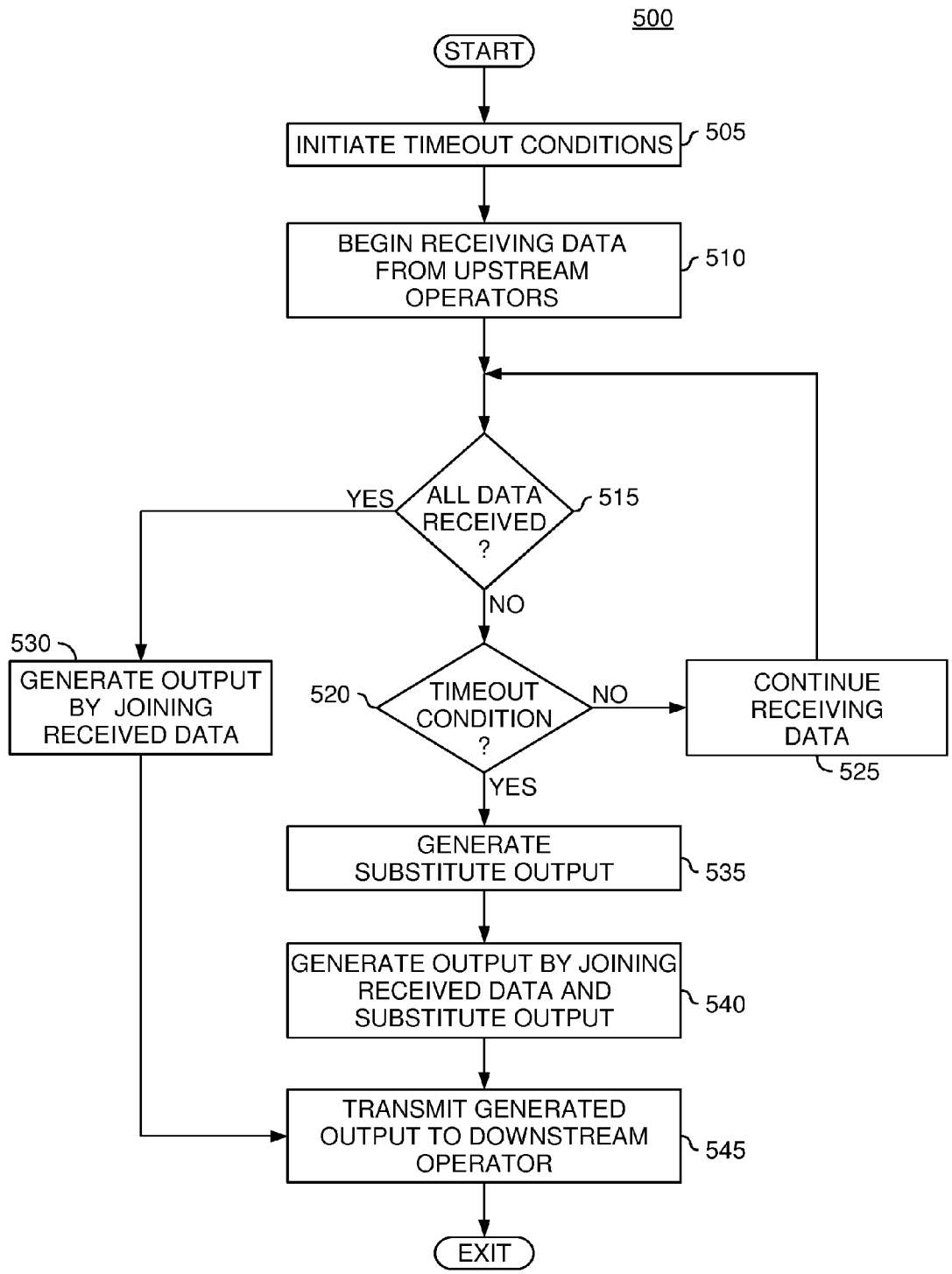
FIG. 5 is a flow diagram illustrating a method for providing an enhanced barrier operator, according to one embodiment described herein.

FIG. 5 is a flow diagram illustrating a method for providing an enhanced barrier operator, according to one embodiment described herein. As shown, the method 500 begins at step 505, where a barrier operator initiates one or more timeout conditions. Generally, the timeout conditions represent conditional logic. For instance, one example of a timeout condition is a timer configured to expire after some period of time. As another example, a timeout condition could be satisfied when a specified number of tuples have been received from a particular upstream processing element. Such a timeout condition could be used, for instance, to prevent a substantial backlog of data from accruing at the barrier operator. As yet another example, a timeout condition could be triggered when the barrier operator receives a punctuation signal, indicating that the barrier operator should immediately generate output data using whatever data it has already received.

The barrier operator then begins receiving data from operators on upstream processing elements (step 510). As discussed above, the barrier operator may be configured to join the output of the upstream operators into one or more output values and to transmit these output values to a downstream operator. Additionally, the barrier operator may be configured to wait for a requisite amount of data from each of the upstream operators before joining the data into output values. For example, the barrier operator could be configured to wait until 10 tuples of data are received from a first upstream operator and 5 tuples of data are received from a second upstream operator.

The barrier operator component 340 then determines whether the requisite amount of data has been received from all of the upstream operators (step 515). If so, the barrier operator generates one or more output values by joining the received data from the upstream operators (step 530). If instead the barrier operator component 340 determines that the requisite amount of data has not been received from at least one of the upstream operators, the barrier operator component 340 determines whether any of the timeout conditions are satisfied (step 520). If the barrier operator component 340 determines none of the timeout conditions are satisfied, the barrier operator continues receiving data from the upstream operators (step 525) and the method 500 returns to step 515.

Upon determining that at least one of the timeout conditions are satisfied, the barrier operator component 340 generates substitute output values for any upstream operators from which the requisite amount of data has not yet been received (step 535). As discussed above, the barrier operator component 340 could predictively generate the substitute output values based on data already received or previously received from the upstream operator. For instance, the barrier operator component 340 could be configured to calculate the substitute output by averaging the already-received values and/or historical values received from the operator. As another example, the barrier operator component 340 could be configured to detect patterns in the output data generated by the upstream operator and to predictively generate substitute output based on these patterns. For example, assume that the barrier operator component 340 determines that the upstream operator frequently outputs a particular tuple of data after outputting a series of other tuples. If the barrier operator component 340 determines that a barrier operator has received the series of other tuples and that a timeout condition has been satisfied before the requisite amount of data has been received, the barrier operator component 340 could generate the particular tuple as a substitute output for the upstream operator.

Upon generating the substitute output, the barrier operator joins the substitute output with any already received data from the upstream processing elements (step 540). Once the barrier operator component 340 generates the joined output at step 530 or at step 540, the barrier operator component 340 transmits the joined output to one or more downstream processing elements (step 545), and the method 500 ends. Advantageously, doing so provides an enhanced barrier operator that helps avoid data backlogs and delays in the stream computing application through the use of timeout conditions and predictive generation of substitute output values.

Figure 6:
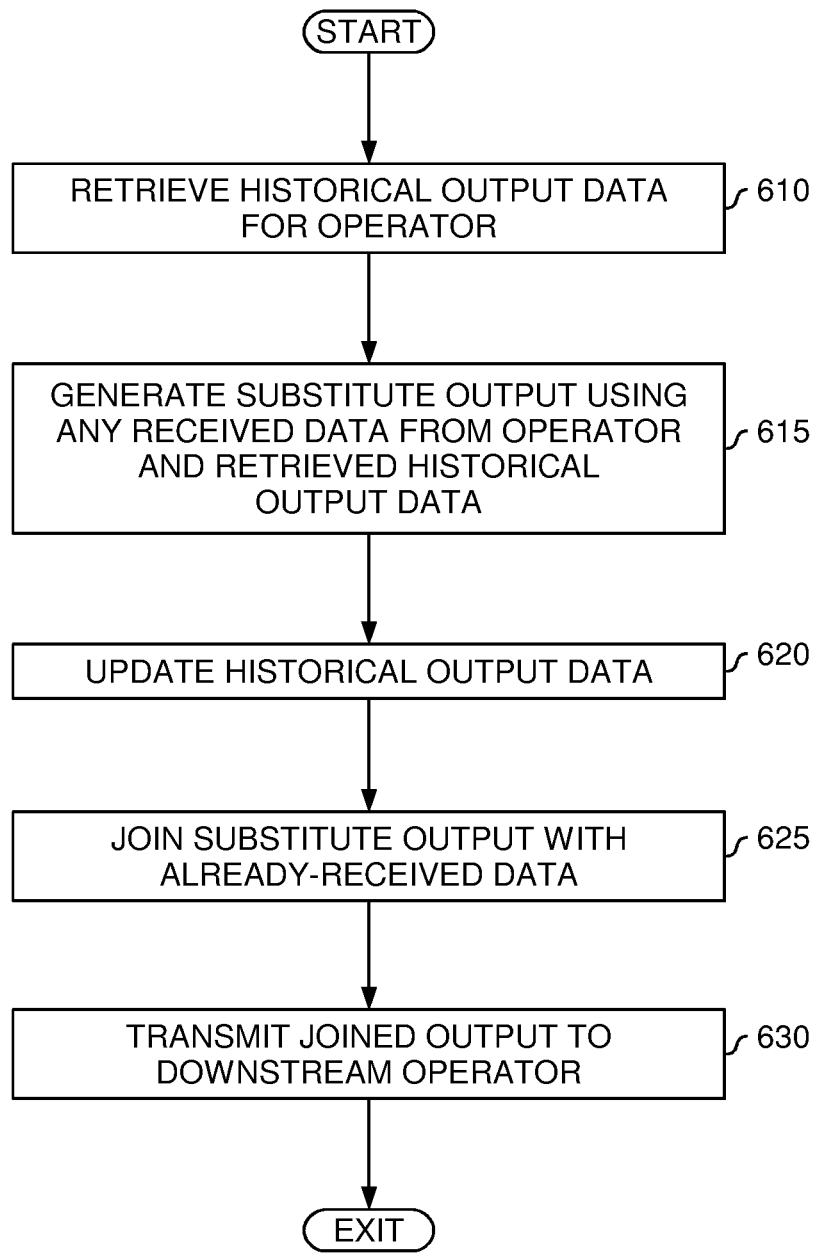
FIG. 6 is a flow diagram illustrating a method for providing substitute output for an operator, according to one embodiment described herein.

FIG. 6 is a flow diagram illustrating a method for providing substitute output for an operator, according to one embodiment described herein. As shown, the method 600 begins at step 610, where the barrier operator component 340 retrieves historical output data for an upstream operator. Such historical output data may include, for instance, data from tuples that the upstream operator has previously generated. Additionally, the historical output data may further specify information describing the previously generated tuples. In one embodiment, the historical output data describes pattern characteristics of output generated by the upstream operator. For example, the historical output data could specify that an operator routinely generates a particular tuple after generating one or more other tuples.

The barrier operator component 340 then generates one or more substitute output tuples using any already-received data from the upstream operator and the retrieved historical output data for the upstream operator (step 615). For instance, the barrier operator component 340 could analyze any already-received data from the upstream operator against the historical output data for the upstream operator to determine whether the already-received data matches any output patterns described in the historical output data. Upon determining that the already-received data does match an output pattern, the barrier operator component 340 could generate substitute output data to satisfy the requisite amount of data for the upstream operator based on the matching output pattern.

Additionally, the barrier operator component 340 updates the historical output data to include information (step 620). For instance, such an update could include the already-received data from the upstream operator. As another example, the update could include the substitute output that the barrier operator component 340 generated for the upstream operator. The barrier operator component 340 then joins the generated substitute output with any already-received data from the upstream operators (step 625). The barrier operator component 340 transmits the joined output to one or more downstream operators (step 630), and the method 600 ends.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a stream computing application containing a barrier operator and configured with a barrier operator component 340 could execute across one or more nodes within the cloud. The barrier operator within the stream computing application could then begin collecting a requisite amount of data from each of one or more upstream operators. If the barrier operator component 340 detects that one or more timeout conditions are satisfied before the requisite amount of data has been collected, the barrier operator component 340 could generate substitute output data to satisfy the requisite amount of data for the upstream operator(s), which could then be joined with any already-received data from the upstream operator(s) and transmitted to one or more downstream operators. Doing so allows users to access the stream computing application with the enhanced barrier operator from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a plurality of compute nodes, each hosting one or more processing elements that include a respective one or more operators configured to perform a respective one or more operations on tuples of streaming data; and
program logic that, when executed by operation of one or more processors, performs an operation comprising:
establishing an operator graph defining at least one execution path through the operators of the plurality of processing elements, and wherein a first processing element in the operator graph includes a barrier operator that joins the output of a plurality of upstream operators included in one or more of the plurality of processing elements; and
upon determining at least one of (i) one or more timeout conditions have been satisfied at the barrier operator and (ii) a punctuation signal has been received at the barrier operator, before data has been received from all of the plurality of upstream operators, generating output data at the barrier operator without the data from at least one of the plurality of upstream operators, comprising:
determining an output pattern for each of the at least one upstream operators, based on historical data tuples received from the respective upstream operator and regardless of a data type of the historical data tuples;
determining substitute data tuple output values for each of the at least one upstream operators, based on the respective output pattern and the historical data tuples received from the respective upstream operator; and
joining the substitute data tuple output values with received data tuple output values from other operators in the plurality of upstream operators to generate the output data.

2. The system of claim 1, the operation further comprising: transmitting, at the barrier operator, the generated output data to one or more downstream operators included in one or more of the plurality of processing elements.

3. The system of claim 1, wherein the substitute data tuple, output values are generated based on historical output generated from the delayed upstream operator.

4. The system of claim 1, wherein only a portion of output has been received from the delayed upstream operator, and wherein the substitute data tuple output values are generated based on the portion of output that has been received.

5. The system of claim 1, wherein the substitute data tuple output values are filler values indicating that no upstream output was received.

6. The system of claim 1, the operation further comprising:
determining that backlog data in a buffer at the barrier operator exceeds a predefined congestion threshold,
wherein generating output data at the barrier operator is performed responsive to determining that the backlog data in the buffer at the barrier operator exceeds the predefined congestion threshold.

7. A computer program product for processing data, comprising:
a computer-readable storage medium having computer readable program code embodied therewith, the computer readable program code comprising:
computer readable program code to establish an operator graph defining at least one execution path through operators of a plurality of processing elements executing on a plurality of compute nodes, wherein each of the operators is configured to perform a respective one or more operations on tuples of streaming data, and wherein a first processing element in the operator graph includes a barrier operator that joins the output of a plurality of upstream operators included in one or more of the plurality of processing elements; and
computer readable program code to, upon determining at least one of (i) one or more timeout conditions have been satisfied at the barrier operator and (ii) a punctuation signal has been received at the barrier operator, before data has been received from all of the plurality of upstream operators, generate output data at the barrier operator without the data from at least one of the plurality of upstream operators, comprising computer readable program code to:
determine an output pattern for each of the at least one upstream operators, based on historical data tuples received from the respective upstream operator and regardless of a data type of the historical data types;
determine substitute data tuple output values for each of the at least one upstream operators, based on the respective output pattern and the historical data tuples received from the respective upstream operator; and
join the substitute output values with received data tuple output values from other operators in the plurality of upstream operators to generate the output data.

8. The computer program product of claim 7, the computer readable program code further comprising:
computer readable program code to transmit, at the barrier operator, the generated output data to one or more downstream operators included in one or more of the plurality of processing elements.

9. The computer program product of claim 7, wherein the computer readable program code to generate output data at the barrier operator further comprises:
computer readable program code to determine that one of the one or more upstream operators is delayed and has not yet transmitted data;
computer readable program code to generate a substitute output for the delayed upstream operator; and
computer readable program code to join the generated substitute output with any output received from other operators in the one or more upstream operators.

10. The computer program product of claim 7, wherein the substitute data tuple output values are generated based on historical output generated from the delayed upstream operator.

11. The computer program product of claim 7, wherein only a portion of output has been received from the delayed upstream operator, and wherein the substitute data tuple output values are generated based on the portion of output that has been received.

12. The computer program product of claim 7, wherein the substitute data tuple output values are filler values indicating that no upstream output was received.

13. The computer program product of claim 7, the computer readable program code further comprising:
computer readable program code to determine that backlog data in a buffer at the barrier operator exceeds a predefined congestion threshold,
wherein the computer readable program code to generate output data at the barrier operator operates responsive to determining that the backlog data in the buffer at the barrier operator exceeds the predefined congestion threshold.

* * * * *